(12) United States Patent
Joseph et al.

(10) Patent No.: US 11,932,420 B2
(45) Date of Patent: Mar. 19, 2024

(54) SYSTEM AND METHOD FOR ASSEMBLING AN AFT FUSELAGE SECTION OF AN AIRCRAFT

(71) Applicant: THE BOEING COMPANY, Chicago, IL (US)

(72) Inventors: Joel Joseph, Mill Creek, WA (US); Richard R. Rosman, Seattle, WA (US); Max Tyler Breedlove, Seal Beach, CA (US); Paul B. Diep, Bothell, WA (US)

(73) Assignee: The Boeing Company, Chicago, IL (US)

( * ) Notice: Subject to any disclaimer, the term of this patent is extended or adjusted under 35 U.S.C. 154(b) by 295 days.

(21) Appl. No.: 17/528,247

(22) Filed: Nov. 17, 2021

(65) Prior Publication Data

US 2023/0150692 A1   May 18, 2023

(51) Int. Cl.
*B64F 5/10* (2017.01)
(52) U.S. Cl.
CPC ....................................... *B64F 5/10* (2017.01)
(58) Field of Classification Search
CPC ................ B64F 5/10; B64C 5/02; B64C 5/16
See application file for complete search history.

(56) References Cited

U.S. PATENT DOCUMENTS

2007/0267541 A1   11/2007   Honorato
2021/0300519 A1*  9/2021   Joseph ...................... B64F 5/10

FOREIGN PATENT DOCUMENTS

DE    102005003297       3/2007
DE    102005003297 B4 *  3/2007   ............. B64C 1/061

OTHER PUBLICATIONS

DE-102005003297-B4 English translation (Year: 2007).*
Extended European Search Report for EP 22207603.6-1004, dated Mar. 23, 2023.

* cited by examiner

*Primary Examiner* — Jason L Vaughan
*Assistant Examiner* — Amanda Kreiling
(74) *Attorney, Agent, or Firm* — Joseph M. Butscher; The Small Patent Law Group LLC

(57) ABSTRACT

A system and method for forming an aft fuselage section of an aircraft include a forward section having a stabilizer channel. The forward section includes an upper sill beam and a lower sill beam. One or more pivot fittings are securely fastened between the upper sill beam and the lower sill beam. The one or more pivot fittings are configured to pivotally couple to a horizontal stabilizer within the stabilizer channel.

23 Claims, 11 Drawing Sheets

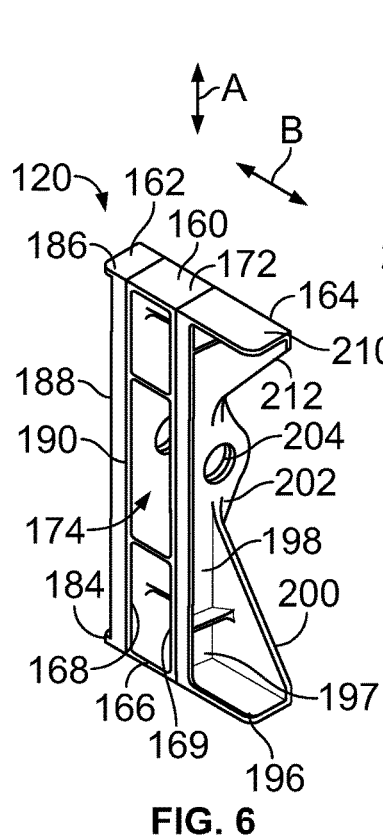 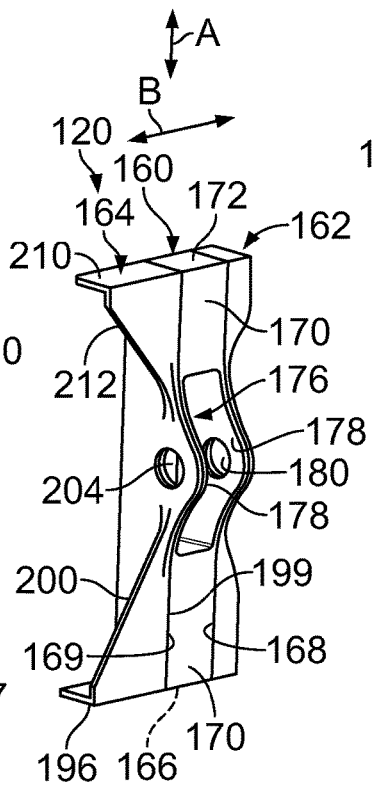 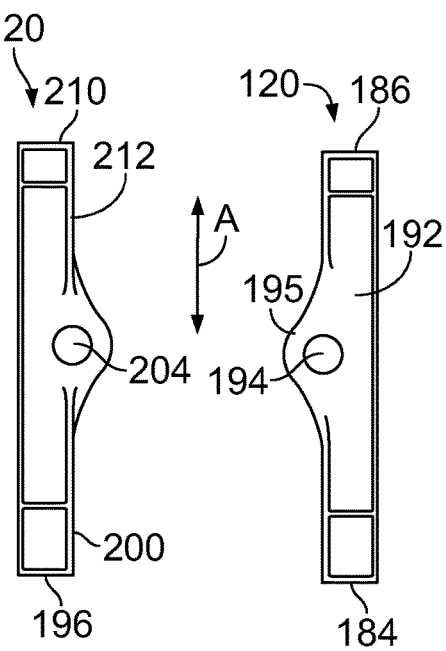
FIG. 6  FIG. 7  FIG. 8  FIG. 9
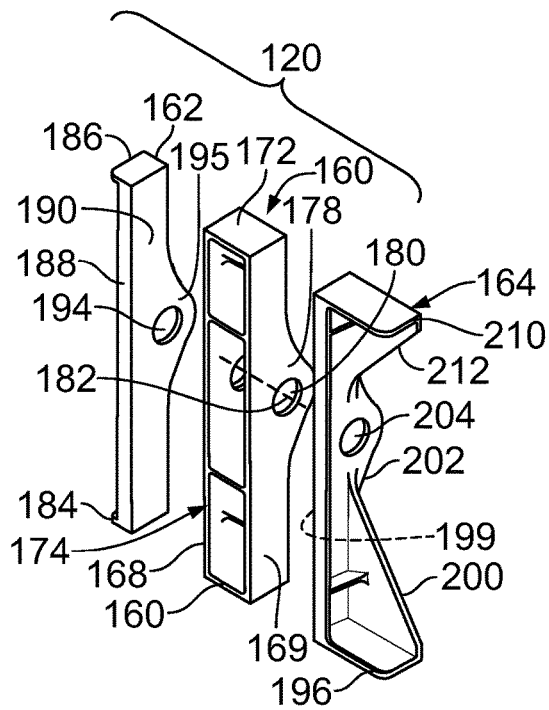
FIG. 10

SYSTEM AND METHOD FOR ASSEMBLING AN AFT FUSELAGE SECTION OF AN AIRCRAFT

FIELD OF THE DISCLOSURE

Examples of the present disclosure generally relate to a system and a method for assembling an aft or otherwise unpressurized fuselage section of an aircraft.

BACKGROUND OF THE DISCLOSURE

Certain known aircraft, such as certain commercial jets, include a horizontal stabilizer secured to an aft or unpressurized fuselage section. FIG. 1 illustrates an isometric exploded view of a known aft fuselage section 10. The aft or unpressurized fuselage section 10 includes a forward section 12, a bulkhead 14, and an aft section 16.

Typically, pivot fittings 18 are secured to the bulkhead 14. FIG. 2 illustrates an isometric front view of the bulkhead 14. As shown, the pivot fittings 18 are secured to a front surface 20 of the bulkhead 14. Separate and distinct beams 19 are coupled to one or both of the pivot fittings 18. The beams 19 are separately positioned and secured to the bulkhead 14 and the pivot fitting(s) 18. The beams 19 are typically necessary to react to lateral loads.

Referring to FIGS. 1 and 2, the bulkhead 14 is joined to the aft section 16. The horizontal stabilizer 22 is then pivotally coupled to the pivot fittings 18, such as through spherical bearings. After the horizontal stabilizer 22 is coupled to the bulkhead 14 through the pivot fittings 18, and the bulkhead 14 is joined to the aft section 16, the resulting sub-assembly 24 is then joined to the forward section 12.

FIG. 3 illustrates an isometric internal view of the known aft fuselage 10 section during a manufacturing process. Referring to FIGS. 1-3, individuals enter confined spaces of the aft fuselage section 10 to complete installation through various operations, including drilling through-holes, inserting shims, inserting and torquing fasteners, and the like. The individuals 30 drill various holes, connect shims, and couple various joints together through numerous fasteners. Typically, the individuals perform such operations within confined spaces within the aft fuselage section 10. As can be appreciated, performing such operations inside the confined spaces can be ergonomically challenging (as shown in FIG. 3), as well as time and labor intensive.

Further, existing architecture for the aft fuselage section 10 includes a convoluted load path for the fuselage to support the horizontal stabilizer 22. In general, the load of the horizontal stabilizer 22 is supported by intercostals and/or other such backup structure 23 in the aft fuselage section 10, and these loads are transferred to the forward section 12 by another set of intercostals via tension bolts that connect to forward longerons. The intercostals and longeron fittings are metallic and tightly-fit (for example, with numerous shims) due to high load transfer requirements. Final installation operations of the intercostals and longerons within the confined spaces of the aft fuselage section 10 is time consuming due to tension bolt installation (torquing requirements), fay surface seal (dissimilar material), and debur (fatigue) requirements.

SUMMARY OF THE DISCLOSURE

A need exists for a system and a method for efficiently and effectively joining a horizontal stabilizer to an aft fuselage section of an aircraft. Further, a need exists for a simpler and easier method for joining the horizontal stabilizer to the aft fuselage section. Additionally, a need exists for a more ergonomic method for securing the horizontal stabilizer to the aft fuselage section.

With those needs in mind, certain examples of the present disclosure provide a system for forming an aft fuselage section of an aircraft. The system includes a forward section having a stabilizer channel. The forward section includes an upper sill beam and a lower sill beam. One or more pivot fittings are securely fastened between the upper sill beam and the lower sill beam. The one or more pivot fittings are configured to pivotally couple to a horizontal stabilizer within the stabilizer channel.

In at least one example, the one or more pivot fittings include a first pivot fitting at a first side of the forward section, and a second pivot fitting at a second side of the forward section, wherein the second side is opposite from the first side.

In at least one example, each of the upper sill beam and the lower sill beam includes a joint panel that mounts to a rear face of the forward section, and a fitting panel that mounts to the one or more pivot fittings. As a further example, the joint panel is perpendicular to the fitting panel.

In at least one example, the one more pivot fittings are securely fastened to the forward section, and the horizontal stabilizer is pivotally coupled to the one or more pivot fittings before the forward section is secured to an aft section.

In at least one example, each of the one or more pivot fittings includes a central column, an outboard flange, and an inboard flange.

In at least one example, the central column includes a base. Lateral support walls extend upwardly from the base. A front wall extends upwardly from the base. A bearing slot is formed in the front wall. The bearing slot is configured to retain a spherical bearing of the horizontal stabilizer. A top ledge is connected to upper portions of the lateral support walls and the front wall. The base secures to the lower sill beam through a first plurality of fasteners, and the top ledge secures to the upper sill beam through a second plurality of fasteners. In at least one example, the outboard flange includes a lower ledge connected to an upper ledge by an outer extension beam. The lower ledge secures to the lower sill beam through a third plurality of fasteners, and the upper ledge secures to the upper sill beam through a fourth plurality of fasteners. In at least one example, the extension beam includes an inboard surface and an outboard surface opposite from the inboard surface. The inboard surface abuts against one of the lateral support walls of the central column.

In at least one example, the inboard flange includes a lower panel inwardly extending from a lower portion of an inboard surface of an inner extension beam. The lower panel connects to a front support brace that angles upwardly and inwardly to connect to a central portion of the inner extension beam. An upper panel inwardly extends from an upper portion of the inboard surface of the inner extension beam. The upper panel connects to a front support brace that angles downwardly and inwardly to connect to the central portion. In at least one example, the inner extension beam includes the inboard surface and an outboard surface opposite from the inboard surface. The outboard surface abuts against one of the lateral support walls of the central column.

In at least one example, the one or more fittings are temporarily attached to the upper sill beam and the lower sill beam before the horizontal stabilizer is coupled to the one or more pivot fittings. In at least one example, the one or more fittings are configured to be removed from the upper sill beam and the lower sill beam. The horizontal stabilizer is configured to be coupled to the one or more fittings. The horizontal stabilizer is configured to be moved into the stabilizer channel of the forward section. The one or more fittings are configured to be re-secured to the upper sill beam and the lower sill beam to secure the horizontal stabilizer within the stabilizer channel of the forward section.

In at least one example, a sub-assembly includes the one or more fittings secured to the upper sill beam and the lower sill beam, and the horizontal stabilizer coupled to the one or more fittings within the stabilizer channel. A bulkhead is secured to an aft section or the sub-assembly. The sub-assembly is secured to the aft section.

Certain examples of the present disclosure provide a method for forming an aft fuselage section of an aircraft. The method includes fastening one or more pivot fittings securely between an upper sill beam and a lower sill beam of a forward section; and coupling a horizontal stabilizer within a stabilizer channel of the forward section to the one or more pivot fittings.

In at least one example, said fastening and said coupling occur before securing the forward section to an aft section.

In at least one example, the method also includes temporarily attaching the one or more fittings to the upper sill beam and the lower sill beam before said coupling; removing one or more fittings from the upper sill beam and the lower sill beam; coupling the horizontal stabilizer to the one or more fittings outside of the stabilizer channel; moving the horizontal stabilizer into the stabilizer channel of the forward section; and re-securing the one or more fittings to the upper sill beam and the lower sill beam to secure the horizontal stabilizer within the stabilizer channel of the forward section.

In at least one example, the method also includes forming a sub-assembly including the one or more fittings secured to the upper sill beam and the lower sill beam, and the horizontal stabilizer coupled to the one or more fittings within the stabilizer channel; securing a bulkhead to an aft section or the sub-assembly; and securing the sub-assembly is secured to the aft section.

Certain examples of the present disclosure provide a pivot fitting for coupling a horizontal stabilizer to a forward section of an aft fuselage section of an aircraft. The pivot fitting includes a central column, an outboard flange, and an inboard flange, as described herein.

BRIEF DESCRIPTION OF THE DRAWINGS

FIG. 6 illustrates an isometric rear view of a pivot fitting, according to an example of the present disclosure.

FIG. 7 illustrates an isometric front view of the pivot fitting of FIG. 6.

FIG. 8 illustrates a first lateral view of the pivot fitting of FIG. 6.

FIG. 9 illustrates a second lateral view of the pivot fitting of FIG. 6.

FIG. 10 illustrates an isometric exploded rear view of the pivot fitting of FIG. 6.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a pivot fitting that enables streamlined assembly of an aft fuselage section of an aircraft. The pivot fitting allows individuals to work outside of the aircraft (in contrast to within the confined spaces of an aft fuselage section) to complete integration of the horizontal stabilizer to the aft fuselage section. Examples of the present disclosure provide a structural arrangement that improves installation ergonomics for the horizontal stabilizer to the aft fuselage section. The pivot fitting also creates improved load paths for pivot fitting integration to the pivot bulkhead.

Figure 4:
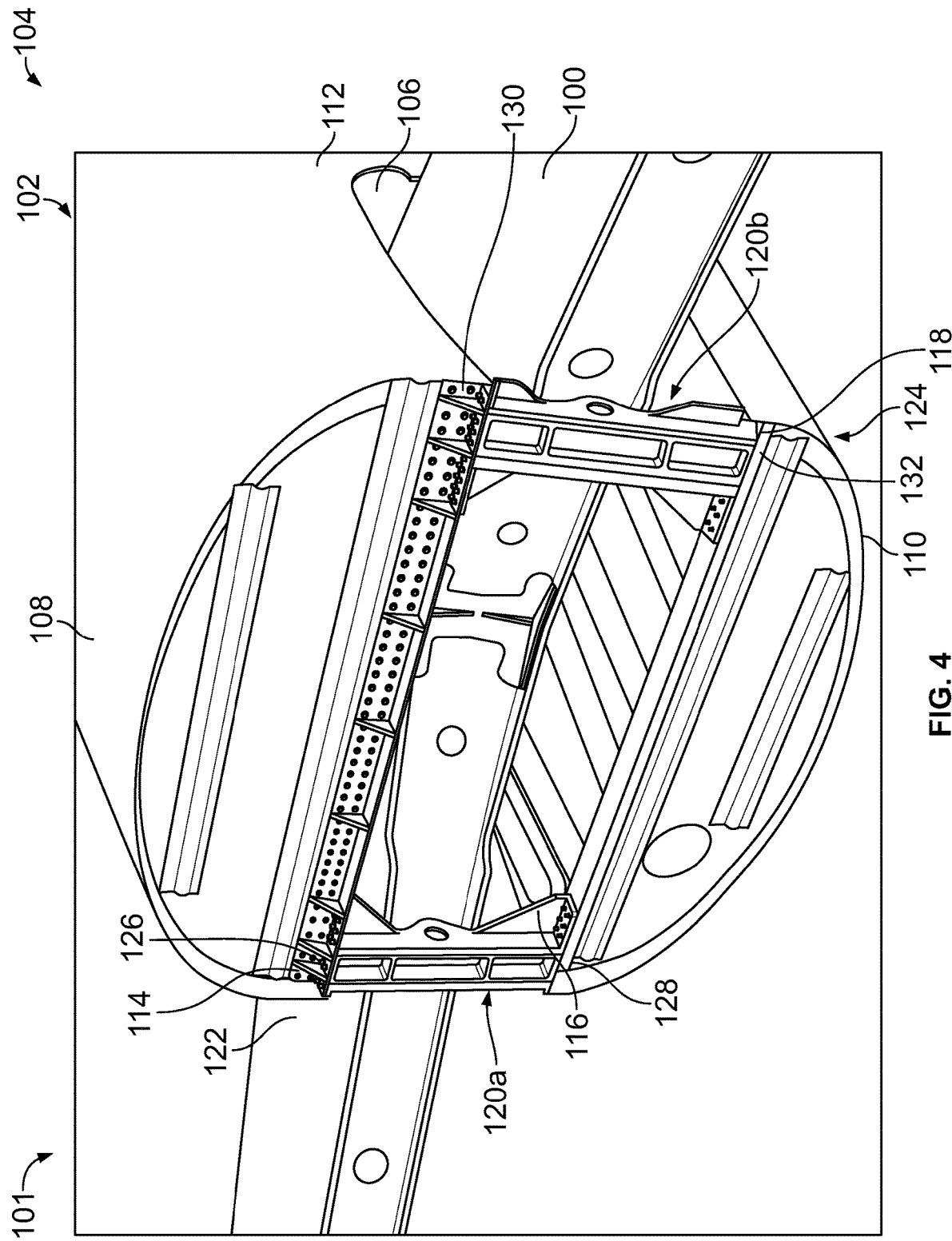
FIG. 4 illustrates an isometric rear view of a horizontal stabilizer coupled to a forward section of an aft fuselage section, according to an example of the present disclosure.

FIG. 4 illustrates an isometric rear view of a horizontal stabilizer 100 coupled to a forward section 102 of an aft fuselage section 104, according to an example of the present disclosure. FIG. 4 illustrates a system 101 for securing the horizontal stabilizer to the forward section 102 of the aft fuselage section 104. The system 101 is configured to form the aft fuselage section 104, which includes an aft section (not shown) that is secured to the forward section 102.

The forward section 102 includes a stabilizer channel 106 extending into the forward section 102 between an upper canopy 108, a lower base 110, and a main body 112. An upper sill beam 114 is secured to a rear surface of the upper canopy 108 above an open end 116 of the stabilizer channel 106. A lower sill beam 118 is secured to the rear surface of the lower base 110 above the open end 116 of the stabilizer channel 106.

A first pivot fitting 120a is secured between the upper sill beam 114 and the lower sill beam 118. A second pivot fitting 120b is secured between the upper sill beam 114 and the lower sill beam 118. The first pivot fitting 120a is at one side (a first side) 122 of the forward section 102 (between respective first ends 126, 128 of the upper sill beam 114 and the lower sill beam 118), and the second pivot fitting 120b is at an opposite side (a second side) 124 of the forward section 102 (between respective second ends 130, 132 of the upper sill beam 114 and the lower sill beam 118).

As described herein, the system 101 for forming the aft fuselage section 104 of an aircraft includes the forward section 102 having the stabilizer channel 106. The forward section 102 includes the upper sill beam 114 and the lower sill beam 118. One or more pivot fittings 120a and/or 120b are securely fastened between the upper sill beam 114 and the lower sill beam 118. The pivot fitting(s) 120a and/or 120b are configured to pivotally couple to the horizontal stabilizer 100 within the stabilizer channel 106.

Figure 5:
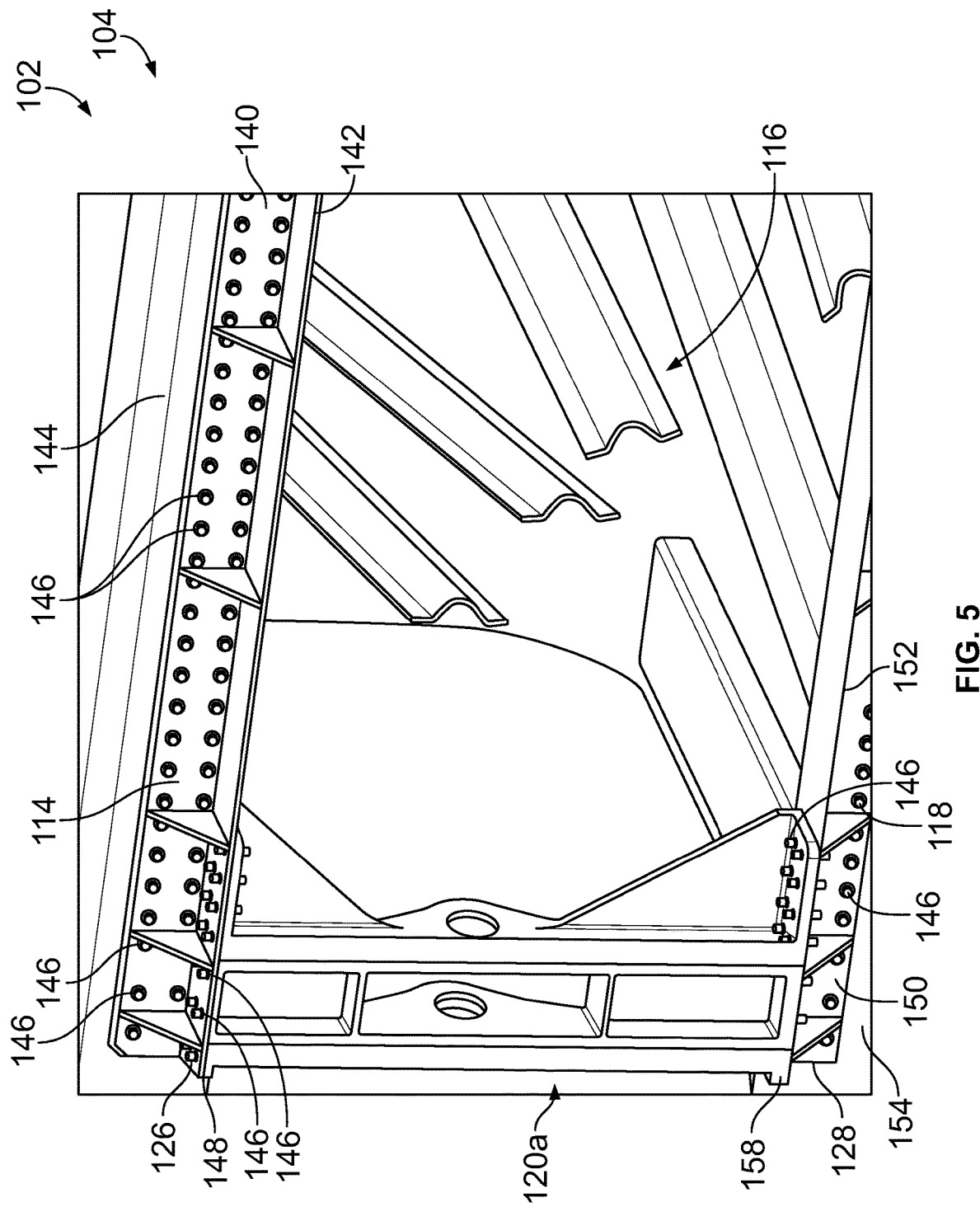
FIG. 5 illustrates an isometric rear view of a pivot fitting secured to an upper sill beam and a lower sill beam of the forward section, according to an example of the present disclosure.

FIG. 5 illustrates an isometric rear view of the pivot fitting 120a secured to the upper sill beam 114 and the lower sill beam 118 of the forward section 102, according to an example of the present disclosure. While the pivot fitting 120a is shown, the pivot fitting 120b shown in FIG. 4 is secured to the upper sill beam 114 and the lower sill beam 118 as shown in FIG. 5.

The upper sill beam 114 includes a joint panel 140 and a fitting panel 142. In at least one example, the joint panel 140 is orthogonal to the fitting panel 142. That is, the joint panel 140 can be perpendicular to the fitting panel 142. The joint panel 140 mounts onto and secures to a rear face 144 of the forward section 102 above the stabilizer channel 106 through a plurality of fasteners 146. The fitting panel 142 mounts over an upper surface 148 of the pivot fitting 120a, and secures thereto through a plurality of fasteners 146.

Similarly, the lower sill beam 118 includes a joint panel 150 and a fitting panel 152. In at least one example, the joint panel 150 is orthogonal to the fitting panel 152. That is, the joint panel 150 can be perpendicular to the fitting panel 152. The joint panel 150 mounts onto and secures to a rear face 154 of the forward section 102 below the stabilizer channel 106 through a plurality of fasteners 146. The fitting panel 152 mounts below a lower surface 158 of the pivot fitting 120a, and secures thereto through a plurality of fasteners 146.

Notably, operations to form the through-holes for the various fasteners 146 (such as drilling), as well as inserting the fasteners 146 and torquing the fasteners to secure fastening positions occurs before the forward section 102 is secured to an aft section. As such, individuals are able to perform the various operations (such as drilling, inserting fasteners, torquing the fasteners, and the like) outside of the fuselage section 104. In this manner, the individuals can ergonomically comfortably perform such operations (in contrast to being at cramped, awkward, and/or contorted positions within a confined space of the of the aft fuselage section 104).

As shown in FIG. 5, the upper sill beam 114 and the lower sill beam 118 are securely fastened to the forward section 102, via the fasteners 146. The upper sill beam 114 and the lower sill beam 118 are secured to the pivot fittings 120a and 120b through vertical fasteners 146 (that is, an individual vertically inserts the fasteners 146), which is an operation that can be performed while comfortably standing outside of the forward section 102.

FIG. 6 illustrates an isometric rear view of a pivot fitting 120, according to an example of the present disclosure. FIG. 7 illustrates an isometric front view of the pivot fitting 120 of FIG. 6. FIG. 8 illustrates a first lateral view of the pivot fitting 120 of FIG. 6. FIG. 9 illustrates a second lateral view of the pivot fitting 120 of FIG. 6. FIG. 10 illustrates an isometric exploded rear view of the pivot fitting 120 of FIG. 6. The pivot fittings 120a and 120b shown in FIG. 4 are configured as shown in FIGS. 6-10. For example, the pivot fitting 120a is configured as shown in FIGS. 6-10, and the pivot fitting 120b can be configured as a mirror image thereof.

Referring to FIGS. 6-10, the pivot fitting 120 includes a central column 160, an outboard flange 162, and an inboard flange 164. The central column 160 includes a base 166, lateral support walls 168, 169 extending upwardly from the base 166, a front wall 170 extending upwardly from the base 166, and a top ledge 172 connected to upper portions of the lateral support walls 168 and the front wall 170. A rear portion 174 of the central column 160 can be open. As shown and described herein, the base 166 secures to the lower sill beam 118 through a plurality (such as a first or second plurality) of fasteners 146, and the top ledge 172 secures to the upper sill beam 114 through a plurality (such as the other of the first or second plurality) of fasteners 146.

A bearing slot 176 is formed in the front wall 170. The bearing slot 176 extends between opposed lateral fins 178 having bearing openings 180. A bearing axis 182 is defined between the opposed bearing openings 180. A spherical bearing of the horizontal stabilizer 100 (shown in FIG. 4) is configured to be rotatably coupled to the bearing slot 176 between the opposed bearing openings 180.

The outboard flange 162 includes a lower ledge 184 connected to an upper ledge 186 by an outer extension beam 188. As shown and described herein, the lower ledge 184 secures to the lower sill beam 118 through a plurality of fasteners, and the upper ledge 186 secures to the upper sill beam 114 through a plurality of fasteners. The outer extension beam 188 includes an inboard surface 190 and an outboard surface 192 opposite from the inboard surface 190. The inboard surface 190 abuts against the lateral support wall 168 of the central column 160. A bearing opening 194 is formed through a spur 195 of the outer extension beam 188. The bearing opening 194 is coaxially aligned with the bearing openings 180 of the central column 160. The outboard flange 162 may or may not secure to the central column 160 through fasteners. Referring to FIGS. 4-10, in at least one example, the outboard flange 162 is not separately secured to the central column 160 through separate fasteners. Instead, the outboard flange 162 is fixed in relation to the central column 160 by way of the fasteners 146 that secure the pivot fitting 120 to the upper sill beam 114 and the lower sill beam 118.

The inboard flange 164 includes a lower panel or ledge 196 inwardly extending from a lower portion of an inboard surface 197 of an inner extension beam 198. The lower ledge 196 connects to a front support brace 200 that angles upwardly and inwardly to connect to a central portion 202 of the inner extension beam 198 below a bearing opening 204, which is coaxially aligned with the bearing openings 180 of the central column 160.

The inboard flange 164 also includes an upper panel or ledge 210 inwardly extending from an upper portion of the inboard surface 197 of the inner extension beam 198. The upper ledge 210 connects to a front support brace 212 that angles downwardly and inwardly to connect to the central portion 202 of the inner extension beam 198 above the bearing opening 204.

The inner extension beam 198 includes the inboard surface 197 and an outboard surface 199 opposite from the inboard surface 197. The outboard surface 199 abuts against the lateral support wall 169 of the central column 160. The inboard flange 164 may or may not secure to the central column 160 through fasteners. Referring to FIGS. 4-10, in at least one example, the inboard flange 164 is not separately secured to the central column 160 through separate fasteners. Instead, the inboard flange 164 is fixed in relation to the central column 160 by way of the fasteners 146 that secure the pivot fitting 120 to the upper sill beam 114 and the lower sill beam 118.

The upper ledge 186 of the outboard flange 162, the top ledge 172 of the central column 160, and the upper ledge 210 of the inboard flange 164 provide flat surfaces that abut against a lower surface of the fitting panel 142 of the upper sill beam 114, which allow for through-holes to be vertically drilled therethrough, and the fasteners 146 to be easily inserted (such as vertically inserted) and engaged from positions outside of the aft or unpressurized fuselage section 104. Similarly, the lower ledge 184 of the outboard flange 162, the base 166 of the central column 160, and the lower ledge 196 of the inboard flange 164 also provide flat surfaces that abut against an upper surface of the fitting panel 152 of the lower sill beam 118, which allow for through-holes to be vertically drilled therethrough, and the fasteners 146 to be easily inserted (such as vertically inserted) and engaged from positions outside of the aft fuselage section 104.

The lateral support walls 168, 169, and the front face 170 of the central column 160 provide a load path that is configured to distribute loads in the directions of arrows A, such as in a vertical direction. Similarly, the outer extension beam 188 of the outboard flange 162 and the inner extension beam 198 of the inboard flange 164 provide load paths that are configured to distribute loads in the direction of arrows A. Additionally, the lower ledge 184 and upper ledge 186 of the inboard flange 164, the base 166 and the top ledge 172 of the central column 160, and the lower ledge 196 and the upper ledge 210 of the inboard flange 164 provide loads paths that are configured to distribute loads in the directions of arrows B, which are orthogonal to the directions of arrows A, such as in a horizontal direction. Further, the front support braces 200 and 212 of the inboard flange 164 are configured to distribute shear loads. The front support braces 200 and 212 provide integrated structures that are configured to react to lateral loads, for example.

As shown in FIGS. 6-10, the pivot fitting 120 includes the central column 160, the outboard flange 162, and the inboard flange 164. As such, the pivot fitting 120 includes three separate and distinct pieces. In this manner, the pivot fitting 120 provides redundant load paths, so that if an anomaly arises in one of the pieces (such as a crack), a robust and reliable load path is still provided by one or both of the other pieces.

Figure 11:
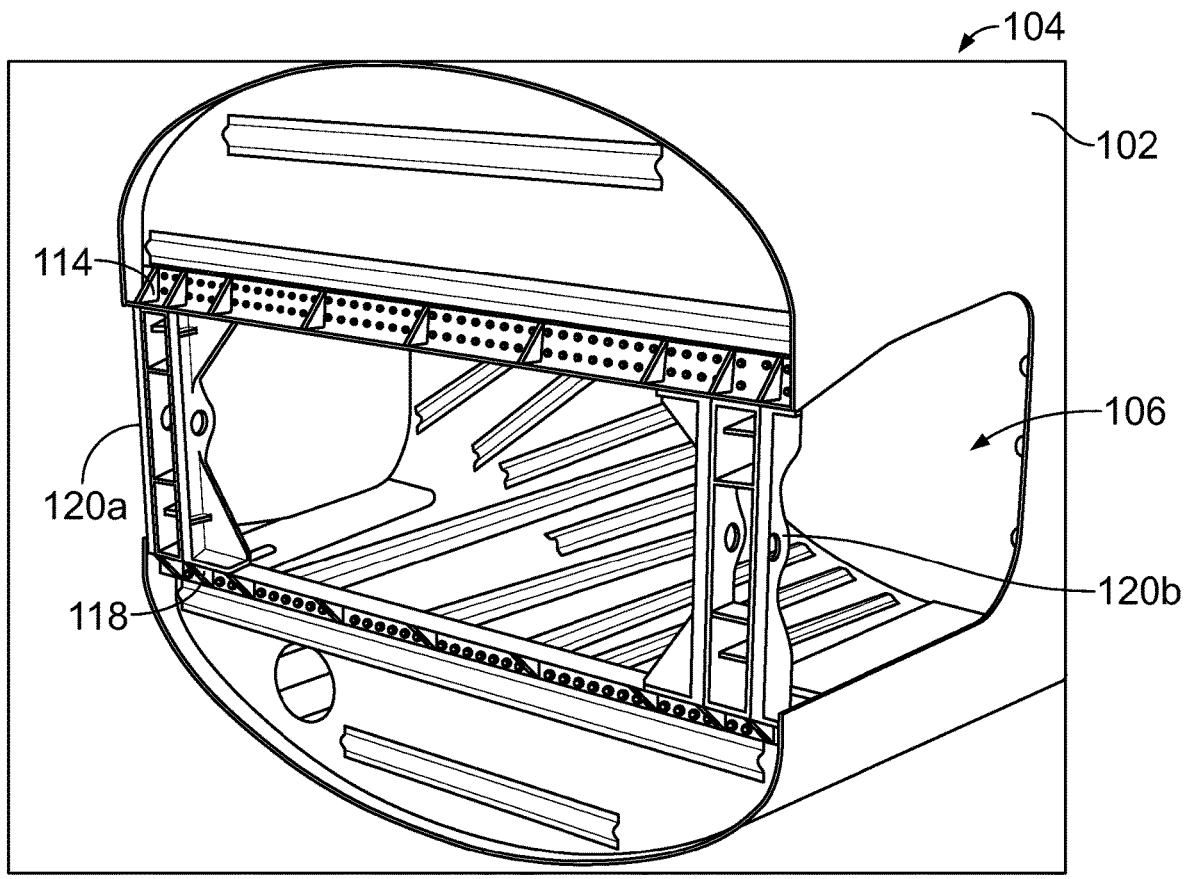
FIG. 11 illustrates an isometric rear view of an aft fuselage section having pivot fittings, according to an example of the present disclosure.

FIG. 11 illustrates an isometric rear view of the aft fuselage section 104 having the pivot fittings 120a and 120b, according to an example of the present disclosure. In order to assemble the aft fuselage section, the pivot fittings 120a and 120b are first secured to the upper sill beam 114 and the lower sill beam 118 before the horizontal stabilizer 100 is positioned within the stabilizer channel 106. As noted, the upper sill beam 114, the lower sill beam 118, and the pivot fittings 120a and 120b are machined (such as via drilling) to form various through-holes, and the various fasteners 146 (shown in FIG. 5, for example) are inserted and engaged to secure the pivot fittings 120a and 120b to the forward section 102 (such as via the upper sill beam 114 and the lower sill beam 118) before the forward section 102 is secured to a bulkhead and/or an aft section. As such, the various operations, such as drilling through-holes, inserting fasteners (and optionally shims), engaging the fasteners to secure components together, and the like can be performed by one or more individuals outside of the aft fuselage section 104 at ergonomically comfortably positions. Thus, as shown in FIG. 11, the pivot fittings 120a and 120b are secured to the forward section 104 and confirmed to be properly positioned and fastened in relation to the forward section 104 before the forward section 102 is secured to the aft section (and optionally before the horizontal stabilizer is positioned within the stabilizer channel 106).

In at least one example, the front joint 102 arrives at a location for final assembly with the pivot fittings 120a and 120b temporarily attached to the upper sill beam 114 and the lower sill beam 118. The pivot fittings 120 and 120b, the upper sill beam 114, and the lower sill beam 118 have already been drilled to provide respective aligned, deburred through-holes at full size.

Figure 1:
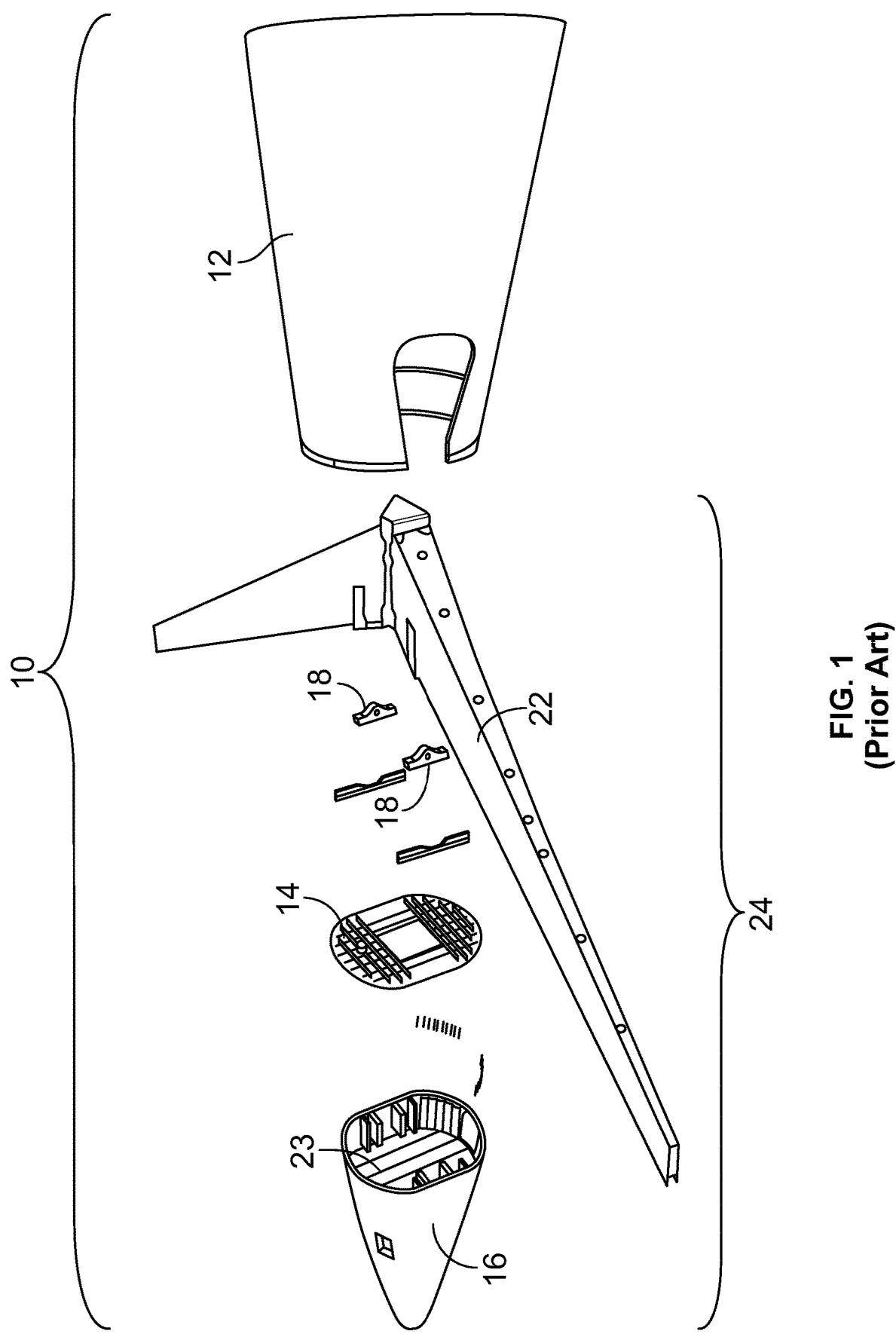
FIG. 1 illustrates an isometric exploded view of a known aft fuselage section.
Figure 2:
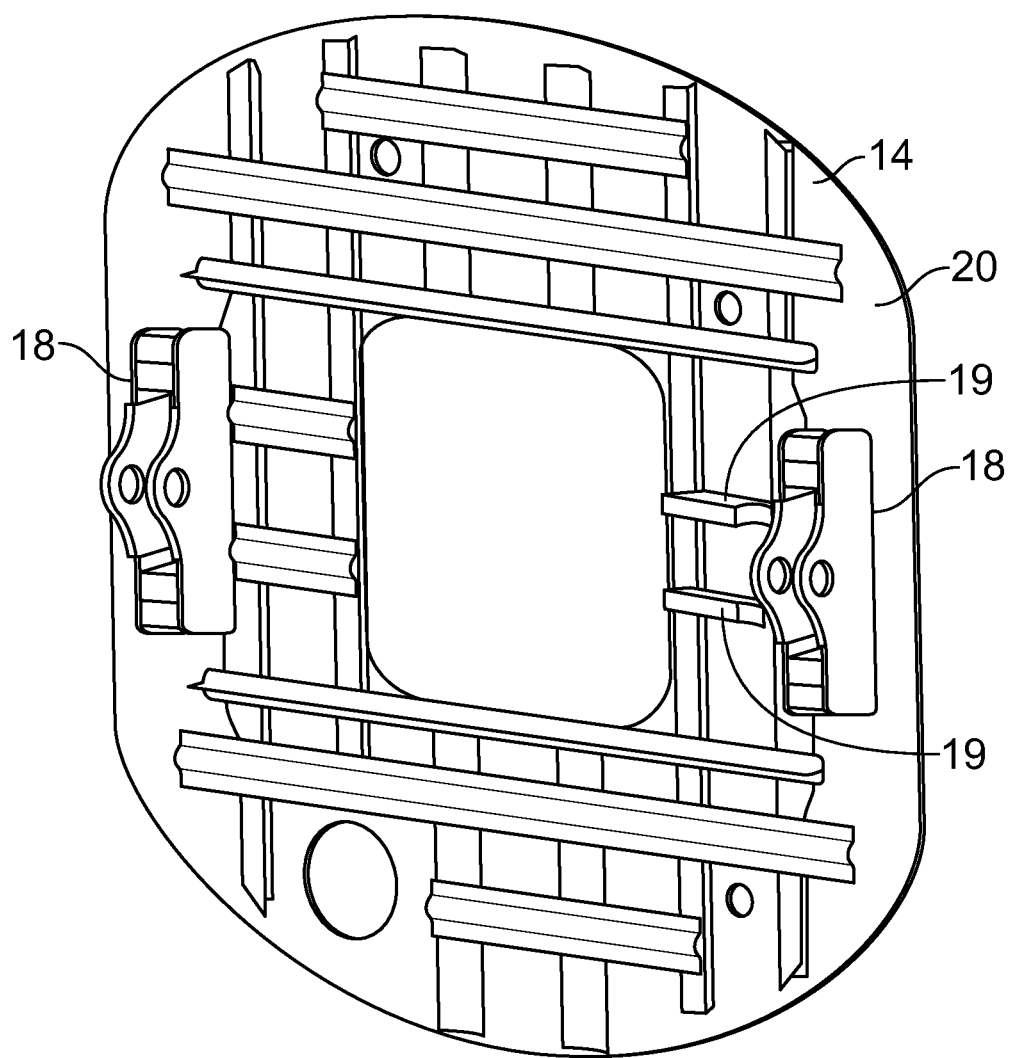
FIG. 2 illustrates an isometric front view of a bulkhead.
Figure 3:
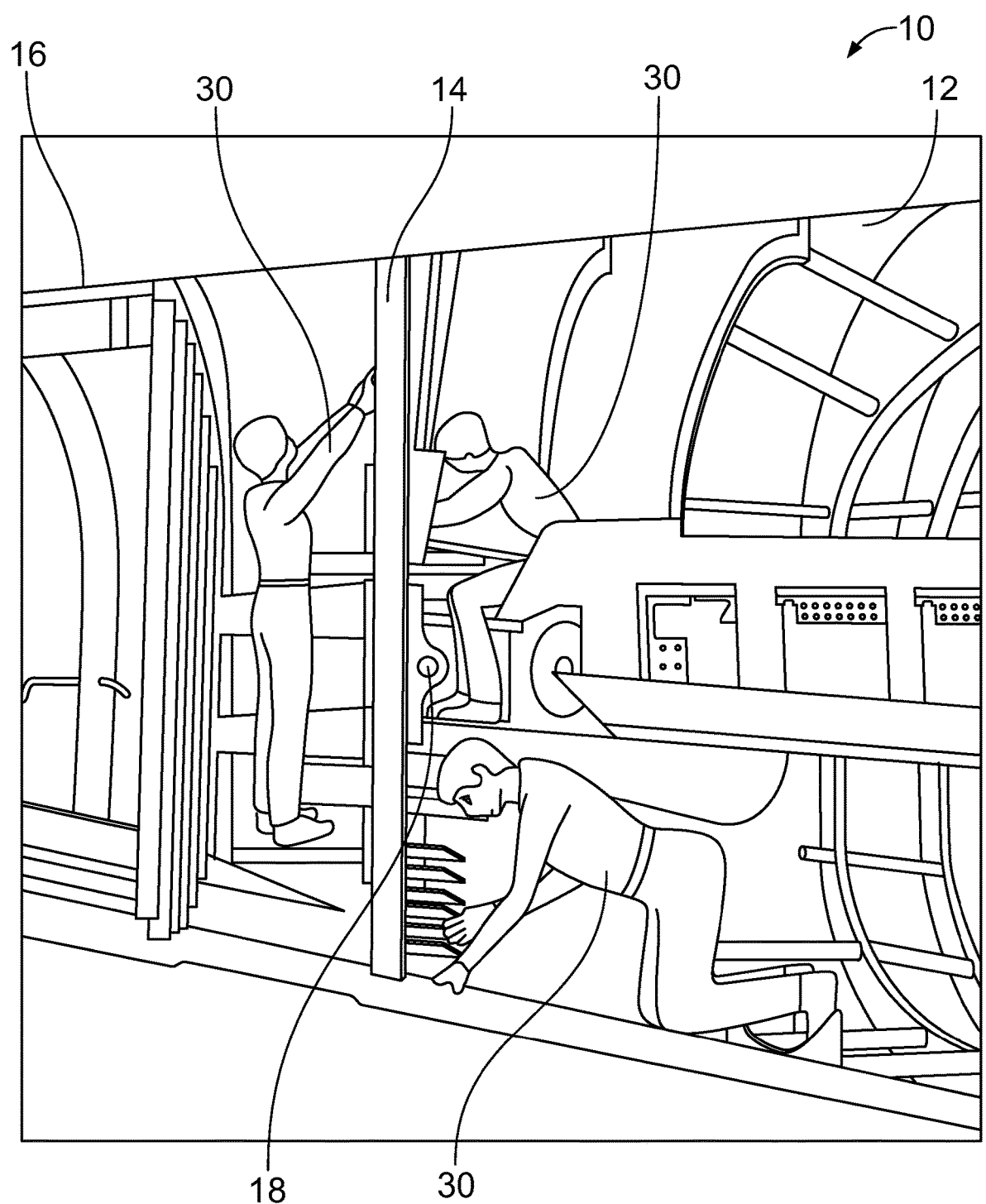
FIG. 3 illustrates an isometric internal view of the known aft fuselage section during a manufacturing process.
Figure 12:
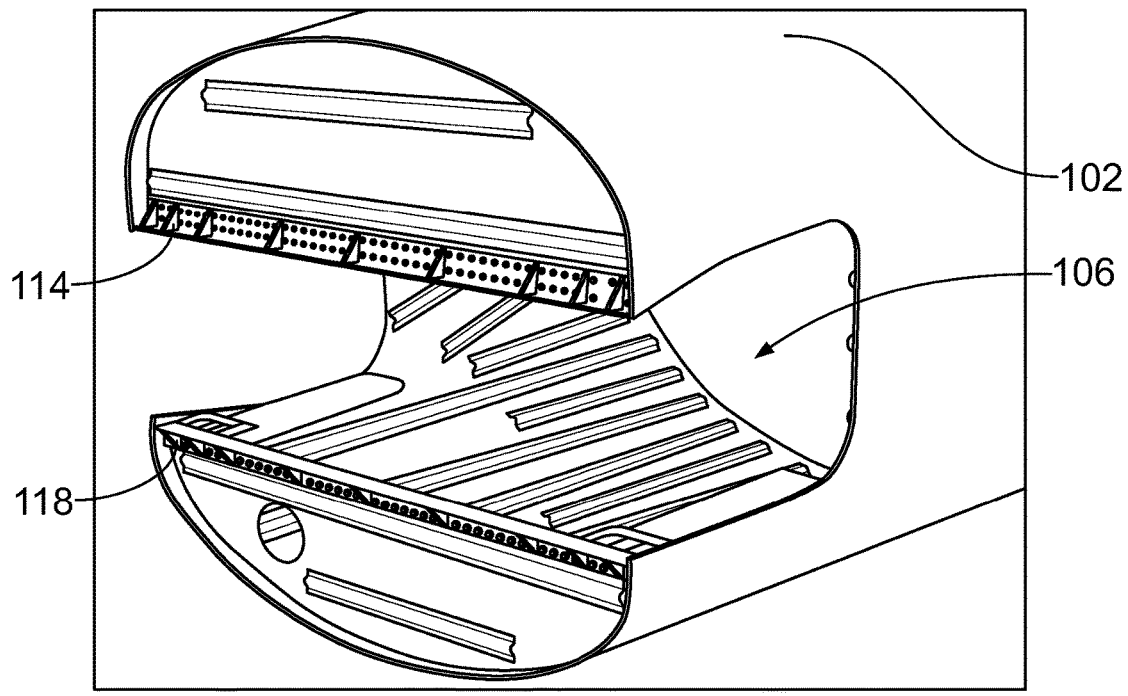
FIG. 12 illustrates an isometric rear view of the aft fuselage section with the pivot fittings removed, according to an example of the present disclosure.

FIG. 12 illustrates an isometric rear view of the aft fuselage section 104 with the pivot fittings 120a and 120b (shown in FIG. 1) removed, according to an example of the present disclosure. Referring to FIGS. 11 and 12, after the pivot fittings 120a and 120b are securely coupled to the forward section 102 to ensure proper positioning, tolerances, and the like, the pivot fittings 120a and 120b are removed to provide an unimpeded path into the stabilizer channel 106.

Figure 13:
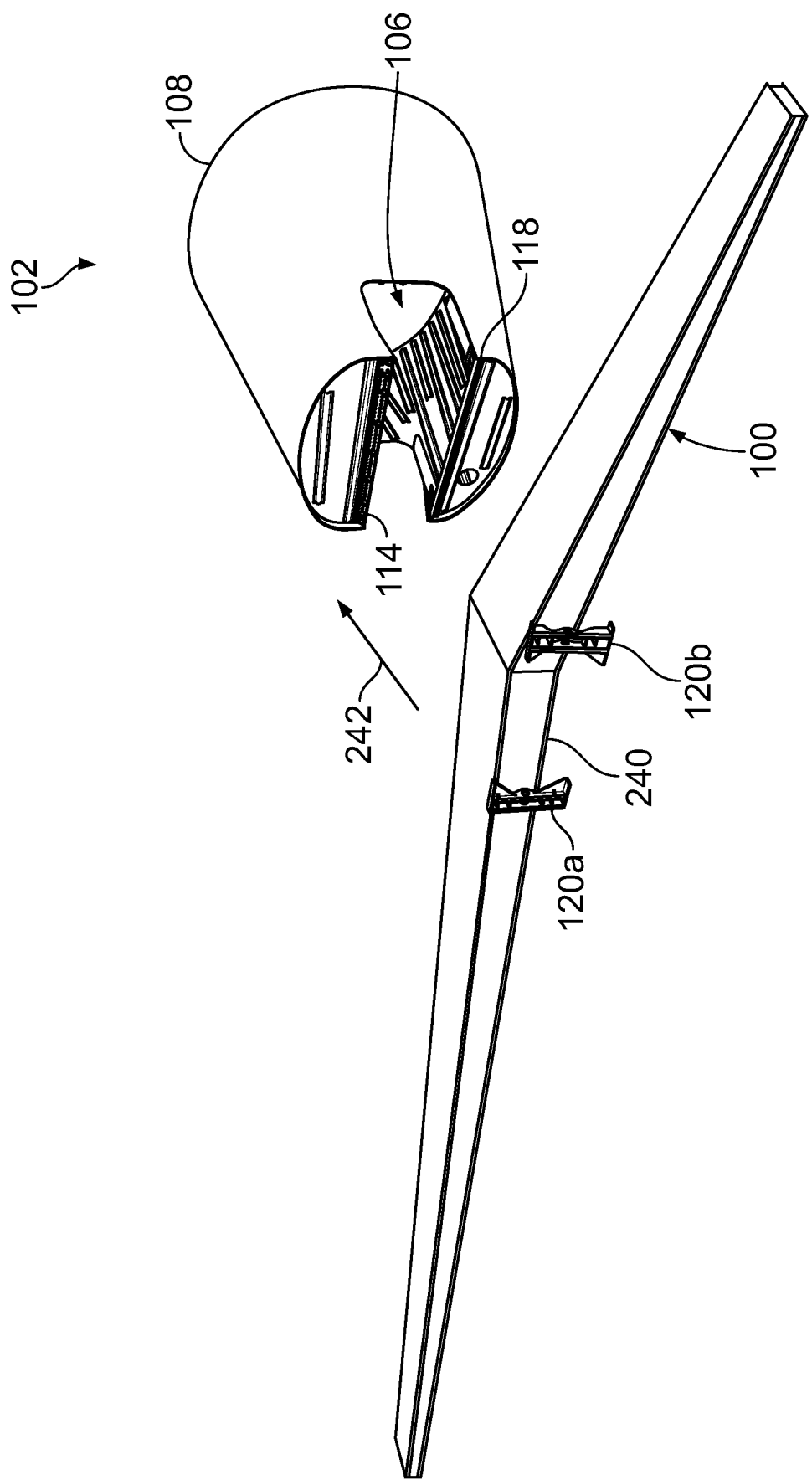
FIG. 13 illustrates an isometric rear view of a horizontal stabilizer separated from a forward section of the aft fuselage section, according to an example of the present disclosure.

FIG. 13 illustrates an isometric rear view of the horizontal stabilizer 100 separated from the forward section 102 of the aft fuselage section 104, according to an example of the present disclosure. Referring to FIGS. 11-13, after the pivot fittings 120a and 120b are removed from the forward section 102, the pivot fittings 120a and 120b are pivotally coupled to rear surfaces 240 of the horizontal stabilizer 100. For example, spherical bearings at the rear surfaces 240 are pivotally secured to the bearing slots 176 (shown in FIG. 7) of the pivot fittings 120a and 120b. After the pivot fittings 120a and 120b are pivotally secured to the horizontal stabilizer 100, the horizontal stabilizer 100 is moved into the stabilizer channel 106 of the forward section 102 in the direction of arrow 242 until the pivot fittings 120a and 120b are realigned with the upper sill beam 114 and the lower sill beam 118 (such that the respective through-holes are aligned), and then an individual can secure the pivot fittings 120a and 120b to the forward section 102, by way of the upper sill beam 114 and the lower sill beam 118, via the fasteners 146. In this manner, the pivot fittings 120a and 120b are secured to the forward section 102, and the horizontal stabilizer 100 is secured to the pivot fittings 120a and 120b within the stabilizer channel 106, thereby providing a sub-assembly that can be secured to a bulkhead and an aft section. No drilling is required at this point. Instead, the drilling previously occurred prior to the final assembly process.

As described herein, the fittings 120a and 120b (which are temporarily secured to the upper sill beam 114 and the lower sill beam 118) are configured to be removed from the upper sill beam 114 and the lower sill beam 118. The horizontal stabilizer 100 is then coupled to the fittings 120a and 120b. The horizontal stabilizer 100 (having the fittings 120a and 120b coupled thereto) then moved into the forward section 102 (such as into the stabilizer channel 106). The fittings 120a and 120b are then re-secured to the upper sill beam 114 and the lower sill beam 118 to secure the horizontal stabilizer 100 within the stabilizer channel 106 of the forward section 102.

Figure 14:
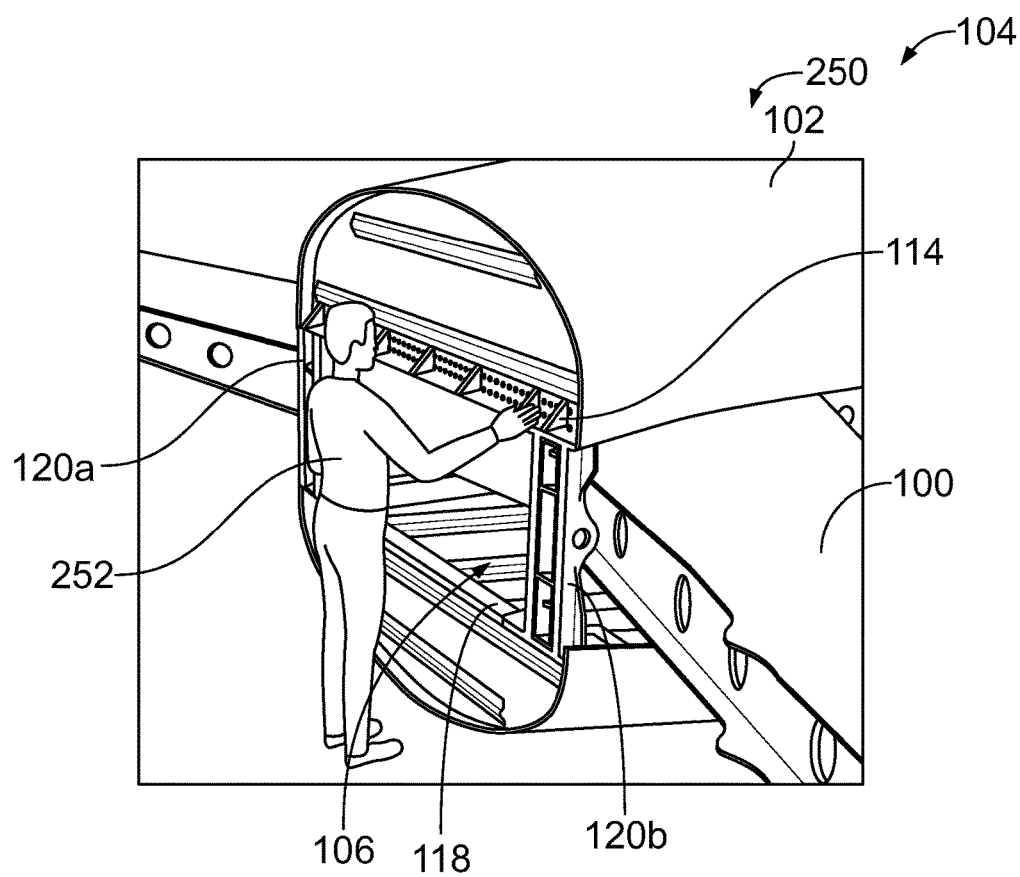
FIG. 14 illustrates an isometric rear view of a sub-assembly of the aft fuselage section, according to an example of the present disclosure.

FIG. 14 illustrates an isometric rear view of the sub-assembly 250 of the aft fuselage section 104, according to an example of the present disclosure. The sub-assembly 250 includes the horizontal stabilizer 100 within the stabilizer channel 106, and pivotally secured to the forward section 102 by the pivot fittings 120a and 120b. As shown, an individual 252 is outside of the aft fuselage section 104 and can operate to fasten the upper sill beam 114 and the lower sill beam 118 to the pivot fittings 120a and 120b by vertically inserting fasteners and torquing the fasteners to securely fasten the pivot fittings 120a and 120b to the forward section 102.

Figure 15:
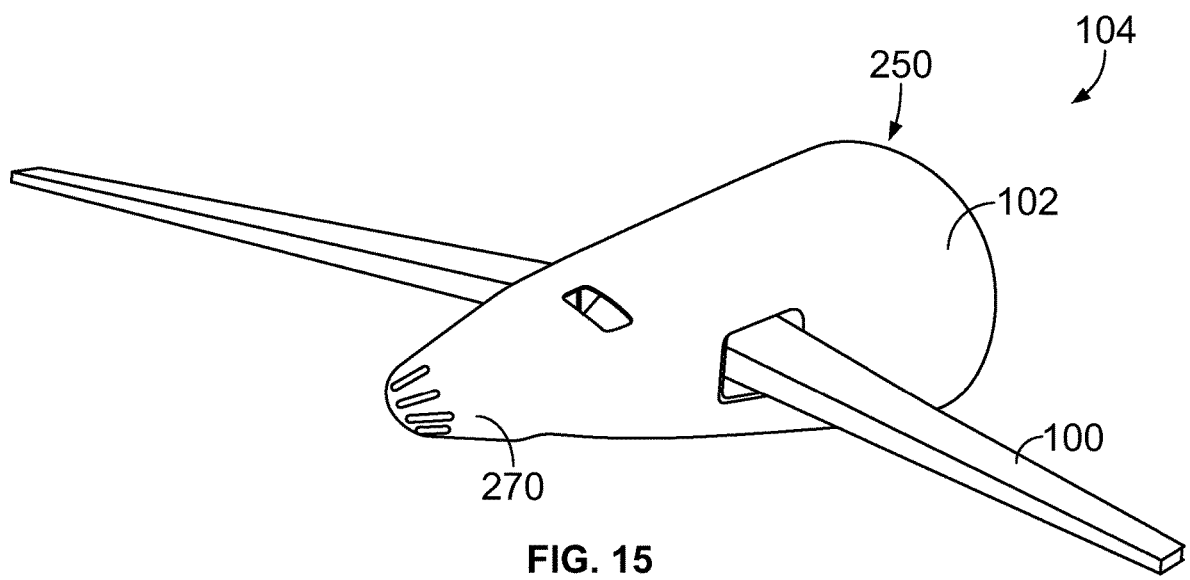
FIG. 15 illustrates an isometric rear view of a completed aft fuselage section, according to an example of the present disclosure.

FIG. 15 illustrates an isometric rear view of a completed aft fuselage 104 section, according to an example of the present disclosure. After the sub-assembly 250 has been formed, as described above, the aft section 270, which can include a bulkhead (or optionally, the bulkhead is first secured to the sub-assembly 250) is secured to the sub-assembly 250.

Figure 16:
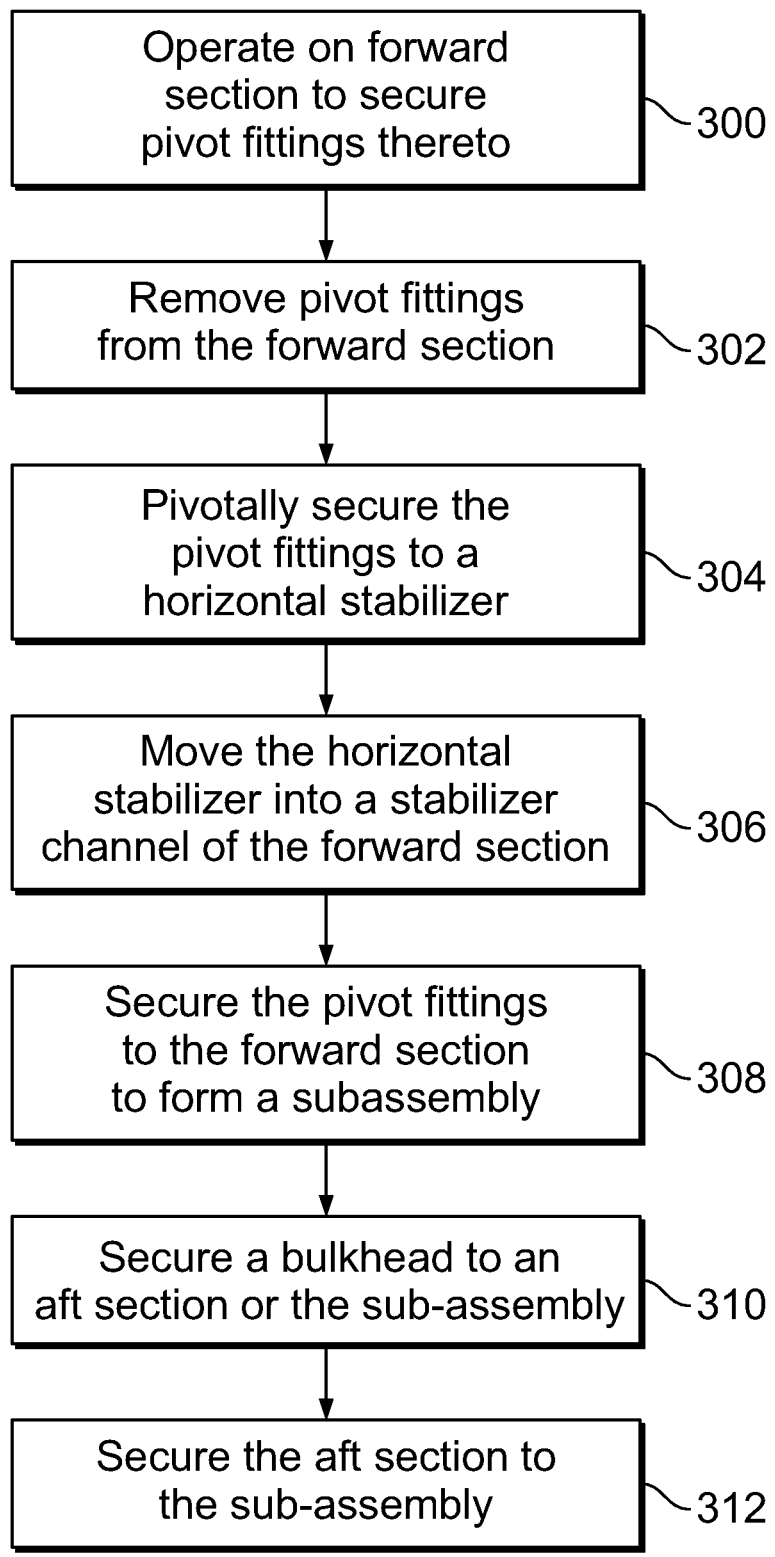
FIG. 16 illustrates a flow chart of a method of forming an aft fuselage section, according to an example of the present disclosure.

FIG. 16 illustrates a flow chart of a method of forming an aft fuselage section, according to an example of the present disclosure. Referring to FIGS. 4-16, at 300, the forward section 102 is operated on to secure pivot fittings 120a and 120b thereto. For example, one or more individuals outside of the aft fuselage section 104 perform various operations, such as drilling through-holes, aligning pivot fittings 120a and 120b in relation to the upper sill beam 114 and the lower sill beam 118, inserting fasteners into aligned through-holes, torquing the fasteners to securely fasten the pivot fittings 120a and 120b to the upper sill beam 114 and the lower sill beam 118, and/or the like, to secure the pivot fittings 120a and 120b to the forward section 102. In this manner, the positioning, tolerances, and securing of the pivot fittings 120a and 120b in relation to the forward section 102 are determined and set before the horizontal stabilizer 100 is coupled to the forward section 102 and the forward section 102 is secured to the aft section 270.

At 302, the pivot fittings 120a and 120b are removed from the forward section 102 to provide an impeded path for the horizontal stabilizer 100 into the stabilizer channel 106 of the forward section 102. At 304, the pivot fittings 120a and 120b are pivotally secured to the horizontal stabilizer 100. At 306, the horizontal stabilizer 100, which now has the pivot fittings 120a and 120b pivotally secured thereto, is moved into the stabilizer channel 106 of the forward section 102. At 308, the pivot fittings 120a and 120b are then secured to the forward section 102 (such as by the upper sill beam 114 and the lower sill beam 118) to form the sub-assembly 250.

Optionally, at 310, a bulkhead is secured to the aft section 270 or the sub-assembly 250. At 312, the aft section 270 is then secured to the sub-assembly 250, thereby completing the aft fuselage section 104.

Referring to FIGS. 4-16, the pivot fitting 120, such as the pivot fittings 120 and 120b, enables streamlined assembly of the aft fuselage section 104. In particular, the pivot fitting 120 is configured to be secured to the front joint 102 before the front joint 102 is secured to the aft section 270. The pivot fitting 120 allows individuals to work outside of the aft fuselage section 104, away from confined spaced, to complete integration of the horizontal stabilizer 100 to the aft fuselage section 104.

The pivot fittings 120a and 120b are secured to the upper sill beam 114 and the lower sill beam 118 outside of the aft fuselage section 104, and away from confined spaces such as above and below the horizontal stabilizer 100. It has been found that this results in a 95% reduction in confined space work and a significant improvement in ergonomics. Factory flow is also improved greatly because there is no drilling required to join the pivot fittings 120a and 120b to the fuselage, as the through-holes have been formed prior to the final assembly process. Further, the pivot fittings 120a and 120b provide improved structural load paths, such as in vertical, horizontal, lateral, and shear directions.

Figure 17:
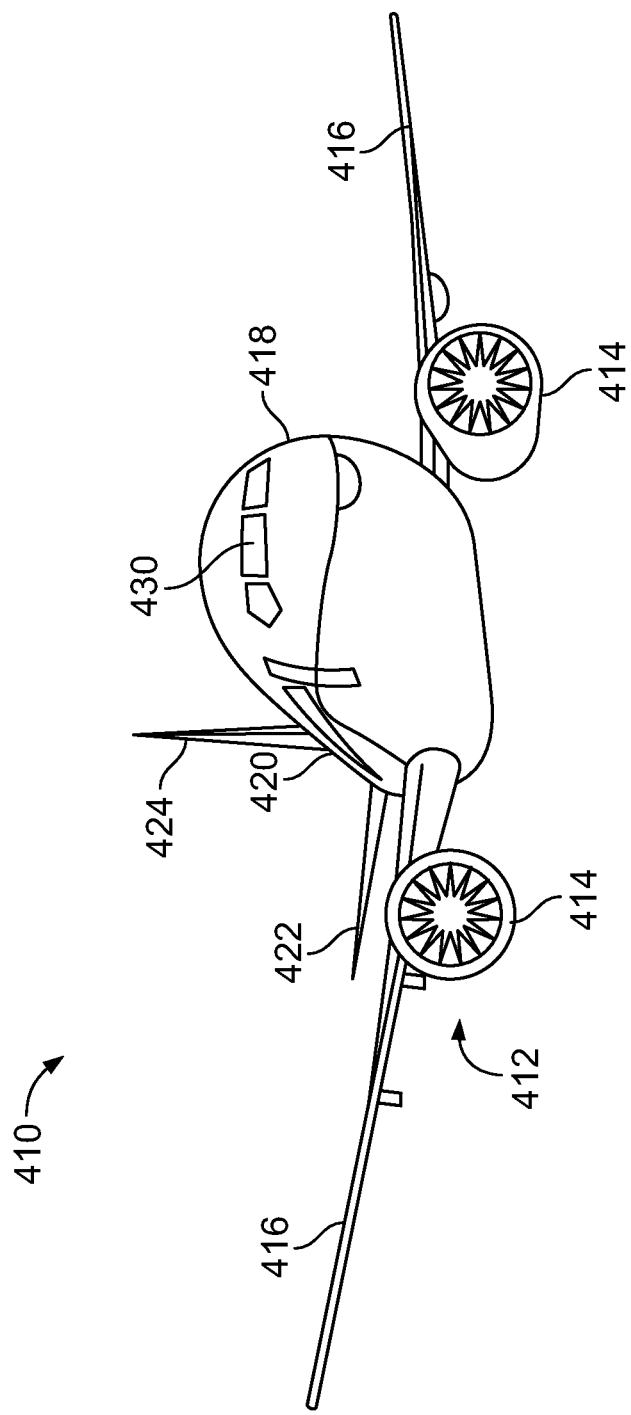
FIG. 17 illustrates an isometric front view of an aircraft, according to an example of the present disclosure.

FIG. 17 illustrates an isometric front view of an aircraft 410, according to an example of the present disclosure. The aircraft 410 includes a propulsion system 412 that includes engines 414, for example. Optionally, the propulsion system 412 may include more engines 414 than shown. The engines 414 are carried by wings 416 of the aircraft 410. In other embodiments, the engines 414 may be carried by a fuselage 418 and/or an empennage 420. The empennage 420 also supports a horizontal stabilizer 422 and a vertical stabilizer 424.

The horizontal stabilizer 422 is an example of the horizontal stabilizer 100, shown in FIGS. 4 and 13-15. The fuselage 418 includes an aft fuselage section, such as the aft fuselage section 104 shown in FIGS. 4, 5, and 11-15. The fuselage 418 of the aircraft 410 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like.

The aircraft 410 shown in FIG. 17 is merely exemplary. It is to be understood that the aircraft 410 can be sized, shaped, and configured differently than shown.

Further, the disclosure comprises examples according to the following clauses:

Clause 1. A system for forming an aft fuselage section of an aircraft, the system comprising:
a forward section having a stabilizer channel, wherein the forward section comprises an upper sill beam and a lower sill beam; and
one or more pivot fittings securely fastened between the upper sill beam and the lower sill beam, wherein the one or more pivot fittings are configured to pivotally couple to a horizontal stabilizer within the stabilizer channel.

Clause 2. The system of Clause 1, wherein the one or more pivot fittings comprise:
a first pivot fitting at a first side of the forward section; and
a second pivot fitting at a second side of the forward section, wherein the second side is opposite from the first side.

Clause 3. The system of Clauses 1 or 2, wherein each of the upper sill beam and the lower sill beam comprises:
a joint panel that mounts to a rear face of the forward section; and
a fitting panel that mounts to the one or more pivot fittings.

Clause 4. The system of Clause 3, wherein the joint panel is perpendicular to the fitting panel.

Clause 5. The system of any of Clauses 1-4, wherein the one more pivot fittings are securely fastened to the forward section, and the horizontal stabilizer is pivotally coupled to the one or more pivot fittings before the forward section is secured to an aft section.

Clause 6. The system of any of Clauses 1-5, wherein each of the one or more pivot fittings comprises:
a central column;
an outboard flange; and
an inboard flange.

Clause 7. The system of Clause 6, wherein the central column comprises:
a base;
lateral support walls extending upwardly from the base;
a front wall extending upwardly from the base, wherein a bearing slot is formed in the front wall, and wherein the bearing slot is configured to retain a spherical bearing of the horizontal stabilizer; and
a top ledge connected to upper portions of the lateral support walls and the front wall,
wherein the base secures to the lower sill beam through a first plurality of fasteners, and wherein the top ledge secures to the upper sill beam through a second plurality of fasteners.

Clause 8. The system of Clause 7, wherein the outboard flange comprises a lower ledge connected to an upper ledge by an outer extension beam, wherein the lower ledge secures to the lower sill beam through a third plurality of fasteners, and wherein the upper ledge secures to the upper sill beam through a fourth plurality of fasteners.

Clause 9. The system of Clause 8, wherein the extension beam comprises an inboard surface and an outboard surface opposite from the inboard surface, wherein the inboard surface abuts against one of the lateral support walls of the central column.

Clause 10. The system of any of Clauses 7-9, wherein the inboard flange comprises:
a lower panel inwardly extending from a lower portion of an inboard surface of an inner extension beam, wherein the lower panel connects to a front support brace that angles upwardly and inwardly to connect to a central portion of the inner extension beam; and
an upper panel inwardly extending from an upper portion of the inboard surface of the inner extension beam, wherein the upper panel connects to a front support brace that angles downwardly and inwardly to connect to the central portion.

Clause 11. The system of Clause 10, wherein the inner extension beam includes the inboard surface and an outboard surface opposite from the inboard surface, and wherein the outboard surface abuts against one of the lateral support walls of the central column.

Clause 12. The system of any of Clauses 1-11, wherein the one or more fittings are temporarily attached to the upper sill beam and the lower sill beam before the horizontal stabilizer is coupled to the one or more pivot fittings.

Clause 13. The system of Clause 12, wherein the one or more fittings are configured to be removed from the upper sill beam and the lower sill beam, wherein the horizontal stabilizer is configured to be coupled to the one or more fittings, wherein the horizontal stabilizer is configured to be moved into the stabilizer channel of the forward section, and wherein the one or more fittings are configured to be re-secured to the upper sill beam and the lower sill beam to secure the horizontal stabilizer within the stabilizer channel of the forward section.

Clause 14. The system of Clauses 12 or 13, wherein a sub-assembly includes the one or more fittings secured to the upper sill beam and the lower sill beam, and the horizontal stabilizer coupled to the one or more fittings within the stabilizer channel, wherein a bulkhead is secured to an aft section or the sub-assembly, and wherein the sub-assembly is secured to the aft section.

Clause 15. A method for forming an aft fuselage section of an aircraft, the method comprising:
fastening one or more pivot fittings securely between an upper sill beam and a lower sill beam of a forward section; and
coupling a horizontal stabilizer within a stabilizer channel of the forward section to the one or more pivot fittings.

Clause 16. The method of Clause 15, wherein said fastening and said coupling occur before securing the forward section to an aft section.

Clause 17. The method of Clauses 15 or 16, further comprising:
temporarily attaching the one or more fittings to the upper sill beam and the lower sill beam before said coupling;
removing one or more fittings from the upper sill beam and the lower sill beam;
coupling the horizontal stabilizer to the one or more fittings outside of the stabilizer channel;
moving the horizontal stabilizer into the stabilizer channel of the forward section; and
re-securing the one or more fittings to the upper sill beam and the lower sill beam to secure the horizontal stabilizer within the stabilizer channel of the forward section.

Clause 18. The method of any of Clauses 15-17, further comprising:
forming a sub-assembly including the one or more fittings secured to the upper sill beam and the lower sill beam, and the horizontal stabilizer coupled to the one or more fittings within the stabilizer channel;
securing a bulkhead to an aft section or the sub-assembly; and
securing the sub-assembly is secured to the aft section.

Clause 19. A pivot fitting for coupling a horizontal stabilizer to a forward section of an aft fuselage section of an aircraft, the pivot fitting comprising:
a central column;
an outboard flange; and
an inboard flange.

Clause 20. The pivot fitting of Clause 19,
wherein the central column comprises:
a base;
lateral support walls extending upwardly from the base;
a front wall extending upwardly from the base, wherein a bearing slot is formed in the front wall, and wherein the bearing slot is configured to retain a spherical bearing of the horizontal stabilizer; and
a top ledge connected to upper portions of the lateral support walls and the front wall,
wherein the base secures to the lower sill beam through a first plurality of fasteners, and wherein the top ledge secures to the upper sill beam through a second plurality of fasteners,
wherein the outboard flange comprises a lower ledge connected to an upper ledge by an outer extension beam, wherein the lower ledge secures to the lower sill beam through a third plurality of fasteners, and wherein the upper ledge secures to the upper sill beam through a fourth plurality of fasteners, and
wherein the inboard flange comprises:
a lower panel inwardly extending from a lower portion of an inboard surface of an inner extension beam, wherein the lower panel connects to a front support brace that angles upwardly and inwardly to connect to a central portion of the inner extension beam; and an upper panel inwardly extending from an upper portion of the inboard surface of the inner extension beam, wherein the upper panel connects to a front support brace that angles downwardly and inwardly to connect to the central portion.

As described herein, examples of the present disclosure provide a system and a method for efficiently and effectively joining a horizontal stabilizer to an aft fuselage section of an aircraft. Further, examples of the present disclosure provide a simpler and easier method for joining the horizontal stabilizer to the aft fuselage section. Additionally, examples of the present disclosure provide a more ergonomic method for securing the horizontal stabilizer to the aft fuselage section.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for forming an aft fuselage section of an aircraft,
    a forward section having a stabilizer channel, wherein the forward section comprises an upper sill beam and a lower sill beam; and
    one or more pivot fittings securely fastened between the upper sill beam and the lower sill beam, wherein the one or more pivot fittings are configured to pivotally couple to a horizontal stabilizer within the stabilizer channel,
    wherein each of the upper sill beam and the lower sill beam comprises:
        a joint panel that mounts to a rear face of the forward section; and
        a fitting panel that mounts to the one or more pivot fittings.

2. The system of claim 1, wherein the one or more pivot fittings comprise:
    a first pivot fitting at a first side of the forward section; and
    a second pivot fitting at a second side of the forward section, wherein the second side is opposite from the first side.

3. The system of claim 1, wherein the joint panel is perpendicular to the fitting panel.

4. The system of claim 1, wherein the one more pivot fittings are securely fastened to the forward section, and the horizontal stabilizer is pivotally coupled to the one or more pivot fittings before the forward section is secured to an aft section.

5. The system of claim 1, wherein each of the one or more pivot fittings comprises:
    a central column;
    an outboard flange; and
    an inboard flange.

6. The system of claim 5, wherein the central column comprises:
    a base;
    lateral support walls extending upwardly from the base;
    a front wall extending upwardly from the base, wherein a bearing slot is formed in the front wall, and wherein the bearing slot is configured to retain a spherical bearing of the horizontal stabilizer; and
    a top ledge connected to upper portions of the lateral support walls and the front wall,
    wherein the base secures to the lower sill beam through a first plurality of fasteners, and wherein the top ledge secures to the upper sill beam through a second plurality of fasteners.

7. The system of claim 6, wherein the outboard flange comprises a lower ledge connected to an upper ledge by an outer extension beam, wherein the lower ledge secures to the lower sill beam through a third plurality of fasteners, and wherein the upper ledge secures to the upper sill beam through a fourth plurality of fasteners.

8. The system of claim 7, wherein the outer extension beam comprises an inboard surface and an outboard surface opposite from the inboard surface, wherein the inboard surface abuts against one of the lateral support walls of the central column.

9. The system of claim 6, wherein the inboard flange comprises:
a lower panel inwardly extending from a lower portion of an inboard surface of an inner extension beam, wherein the lower panel connects to a front support brace that angles upwardly and inwardly to connect to a central portion of the inner extension beam; and
an upper panel inwardly extending from an upper portion of the inboard surface of the inner extension beam, wherein the upper panel connects to a front support brace that angles downwardly and inwardly to connect to the central portion.

10. The system of claim 9, wherein the inner extension beam includes the inboard surface and an outboard surface opposite from the inboard surface, and wherein the outboard surface abuts against one of the lateral support walls of the central column.

11. The system of claim 1, wherein the one or more fittings are temporarily attached to the upper sill beam and the lower sill beam before the horizontal stabilizer is coupled to the one or more pivot fittings.

12. The system of claim 11, wherein the one or more fittings are configured to be removed from the upper sill beam and the lower sill beam, wherein the horizontal stabilizer is configured to be coupled to the one or more fittings, wherein the horizontal stabilizer is configured to be moved into the stabilizer channel of the forward section, and wherein the one or more fittings are configured to be re-secured to the upper sill beam and the lower sill beam to secure the horizontal stabilizer within the stabilizer channel of the forward section.

13. The system of claim 11, wherein a sub-assembly includes the one or more fittings secured to the upper sill beam and the lower sill beam, and the horizontal stabilizer coupled to the one or more fittings within the stabilizer channel, wherein a bulkhead is secured to an aft section or the sub-assembly, and wherein the sub-assembly is secured to the aft section.

14. A method for forming an aft fuselage section of an aircraft, the method comprising:
fastening one or more pivot fittings securely between an upper sill beam and a lower sill beam of a forward section;
coupling a horizontal stabilizer within a stabilizer channel of the forward section to the one or more pivot fittings;
forming a sub-assembly including the one or more fittings secured to the upper sill beam and the lower sill beam, and the horizontal stabilizer coupled to the one or more fittings within the stabilizer channel;
securing a bulkhead to an aft section or the sub-assembly; and
securing the sub-assembly to the aft section.

15. The method of claim 14, wherein said fastening and said coupling occur before securing the forward section to an aft section.

16. The method of claim 14, further comprising:
temporarily attaching the one or more fittings to the upper sill beam and the lower sill beam before said coupling;
removing one or more fittings from the upper sill beam and the lower sill beam;
coupling the horizontal stabilizer to the one or more fittings outside of the stabilizer channel;
moving the horizontal stabilizer into the stabilizer channel of the forward section; and
re-securing the one or more fittings to the upper sill beam and the lower sill beam to secure the horizontal stabilizer within the stabilizer channel of the forward section.

17. A pivot fitting for coupling a horizontal stabilizer to a forward section of an aft fuselage section of an aircraft, the pivot fitting comprising:
an outboard flange;
an inboard flange; and
a central column comprising:
a base;
lateral support walls extending upwardly from the base;
a front wall extending upwardly from the base, wherein a bearing slot is formed in the front wall, and wherein the bearing slot is configured to retain a spherical bearing of the horizontal stabilizer; and
a top ledge connected to upper portions of the lateral support walls and the front wall,
wherein the base is configured to secure to a lower sill beam through a first plurality of fasteners, and wherein the top ledge is configured to secure to an upper sill beam through a second plurality of fasteners.

18. The pivot fitting of claim 17,
wherein the outboard flange comprises a lower ledge connected to an upper ledge by an outer extension beam, wherein the lower ledge is configured to secure to the lower sill beam through a third plurality of fasteners, and wherein the upper ledge is configured to secure to the upper sill beam through a fourth plurality of fasteners.

19. The pivot fitting of claim 18, wherein the outer extension beam comprises an inboard surface and an outboard surface opposite from the inboard surface, wherein the inboard surface abuts against one of the lateral support walls of the central column.

20. The pivot fitting of claim 18, wherein the inboard flange comprises:
a lower panel inwardly extending from a lower portion of an inboard surface of an inner extension beam, wherein the lower panel connects to a front support brace that angles upwardly and inwardly to connect to a central portion of the inner extension beam; and
an upper panel inwardly extending from an upper portion of the inboard surface of the inner extension beam, wherein the upper panel connects to a front support brace that angles downwardly and inwardly to connect to the central portion.

21. The pivot fitting of claim 20, wherein the inner extension beam includes the inboard surface and an outboard surface opposite from the inboard surface, and wherein the outboard surface abuts against one of the lateral support walls of the central column.

22. A system for forming an aft fuselage section of an aircraft, the system comprising:
a forward section having a stabilizer channel, wherein the forward section comprises an upper sill beam and a lower sill beam; and
one or more pivot fittings securely fastened between the upper sill beam and the lower sill beam, wherein the one or more pivot fittings are configured to pivotally couple to a horizontal stabilizer within the stabilizer channel,
wherein the one or more fittings are temporarily attached to the upper sill beam and the lower sill beam before the horizontal stabilizer is coupled to the one or more pivot fittings, wherein the one or more fittings are configured to be removed from the upper sill beam and the lower sill beam, wherein the horizontal stabilizer is configured to be coupled to the one or more fittings, wherein the horizontal stabilizer is configured to be moved into the stabilizer channel of the forward section, and wherein the one or more fittings are configured to be re-secured to the upper sill beam and the lower sill beam to secure the horizontal stabilizer within the stabilizer channel of the forward section.

23. A method for forming an aft fuselage section of an aircraft, the method comprising:
- fastening one or more pivot fittings securely between an upper sill beam and a lower sill beam of a forward section;
- temporarily attaching the one or more fittings to the upper sill beam and the lower sill beam;
- after said temporarily attaching, coupling a horizontal stabilizer within a stabilizer channel of the forward section to the one or more pivot fittings;
- removing the one or more fittings from the upper sill beam and the lower sill beam;
- coupling the horizontal stabilizer to the one or more fittings outside of the stabilizer channel;
- moving the horizontal stabilizer into the stabilizer channel of the forward section; and
- re-securing the one or more fittings to the upper sill beam and the lower sill beam to secure the horizontal stabilizer within the stabilizer channel of the forward section.

* * * * *